(12) United States Patent
Shin et al.

(10) Patent No.: US 12,391,154 B2
(45) Date of Patent: Aug. 19, 2025

(54) RECLINER FOR VEHICLE SEAT

(71) Applicant: Hyundai Transys Inc., Seosan-si (KR)

(72) Inventors: Kyu Ha Shin, Hwaseong-si (KR);
Woosool Song, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 156 days.

(21) Appl. No.: 18/328,945

(22) Filed: Jun. 5, 2023

(65) Prior Publication Data
US 2024/0034203 A1 Feb. 1, 2024

(30) Foreign Application Priority Data

Jul. 28, 2022 (KR) ........................ 10-2022-0094177

(51) Int. Cl.
*B60N 2/225* (2006.01)
*B60N 2/02* (2006.01)

(52) U.S. Cl.
CPC ....... *B60N 2/2252* (2013.01); *B60N 2/02246* (2023.08)

(58) Field of Classification Search
CPC .................................................. B60N 2/2252
See application file for complete search history.

(56) References Cited

U.S. PATENT DOCUMENTS

| | | | | |
|---|---|---|---|---|
| 6,619,743 B1 * | 9/2003 | Scholz | .................. | B60N 2/225 74/528 |
| 7,264,566 B2 * | 9/2007 | Dill | ..................... | B60N 2/2252 475/164 |
| 7,281,765 B2 * | 10/2007 | Scholz | .................. | B60N 2/2254 475/162 |
| 7,455,361 B2 * | 11/2008 | Stemmer | .............. | B60N 2/2254 475/162 |
| 7,878,593 B2 * | 2/2011 | Nae | ....................... | B60N 2/2252 297/362 |
| 7,878,594 B2 * | 2/2011 | Fukuzawa | ............ | B60N 2/2254 297/362.12 |
| 7,946,652 B2 * | 5/2011 | Stilleke | .................. | B60N 2/938 297/367 R |
| 8,360,525 B2 * | 1/2013 | Cha | ..................... | B60N 2/02246 297/362 |
| 9,114,737 B2 * | 8/2015 | Stilleke | ................ | B60N 2/2252 |

(Continued)

FOREIGN PATENT DOCUMENTS

| | | |
|---|---|---|
| FR | 3095171 A1 | 10/2020 |
| JP | 2008-006265 A | 1/2008 |
| KR | 2015-0096930 A | 8/2015 |

(Continued)

OTHER PUBLICATIONS

Klaus-Dieter Lotz, "European Extended Search Report for EP Application No. 23175616.4", Jan. 12, 2024, EPO, Germany.

*Primary Examiner* — Timothy J Brindley
(74) *Attorney, Agent, or Firm* — Bridgeway IP Law Group, PLLC; Jihun Kim

(57) ABSTRACT

A recliner for a vehicle seat includes a first gear having a center hole provided at a center thereof, a second gear being internally in contact with the first gear and configured to eccentrically engage with the first gear, a socket having a coupling portion configured to be coupled to the center hole, and a pair of wedge cams disposed between the socket and the second gear and configured to restrain or release the socket and the second gear.

10 Claims, 10 Drawing Sheets

(56) References Cited

U.S. PATENT DOCUMENTS 9,205,765 B2 * 12/2015 Kim ............... B60N 2/2254
11,407,337 B2   8/2022 Lee

FOREIGN PATENT DOCUMENTS

| KR | 101775371 B1 * | 9/2017 | |
|----|----|----|----|
| KR | 10-2236705 B1 | 4/2021 | |
| WO | WO-2007105643 A1 * | 9/2007 | ........... B60N 2/2252 |

* cited by examiner

RECLINER FOR VEHICLE SEAT

CROSS-REFERENCE TO RELATED APPLICATIONS

This application claims priority to and the benefit of Korean Patent Application No. 10-2022-0094177 filed in the Korean Intellectual Property Office on Jul. 28, 2022, the entire contents of which are incorporated herein by reference.

TECHNICAL FIELD

The present invention relates to a recliner for a vehicle seat.

BACKGROUND ART

In general, a recliner may adjust an angle of a seatback in a forward/rearward direction with respect to a seat cushion and provide a high coupling force between components during a reclining operation, thereby ensuring safety of a vehicle occupant. The recliners may be classified into a manual recliner that adjusts an angle of a seatback in response to a lever manipulation, and a powered recliner that may be automatically operated by power of a motor generated in response to a switch manipulation.

FIG. 1 is a view illustrating a state in which a recliner for a vehicle seat in the related art is mounted on a seatback frame, FIG. 2 is a cross-sectional side view of the recliner for a vehicle seat in the related art, FIG. 3 is a view illustrating a collar part of the recliner for a vehicle seat in the related art, and FIG. 4 is a top plan view illustrating a state in which wedge cams of the recliner for a vehicle seat in the related art are coupled to the collar part.

As illustrated in FIG. 1, a recliner 100 may be mounted on a seatback frame SF in a seatback SB. As illustrated in FIGS. 2 and 3, the recliner 100 in the related art includes a first gear 101 having inner teeth 101a, and a second gear 102 having outer teeth 102a that engage with the inner teeth 101a of the first gear 101. An eccentric state of the second gear 102, which is eccentrically coupled in the first gear 101, is maintained by a pair of wedge cams 103 interposed between a bushing 108 and a collar part 101b of the first gear 101 and elastically supported by a spring 109. Further, a locking state or an unlocking state for an operation of the recliner may be maintained in the same way. The pair of wedge cams 103 is elastically supported by two opposite bent ends 109a of the spring 109, and a spread state thereof may be maintained. When a motor M is operated by an operation of a switch SW and a shaft 104 connected to the motor M rotates, the second gear 102 is rotated by a rotation of a socket 105 connected to the shaft 104 and rotations of the wedge cams 103, and the first gear 101 rotates in conjunction with the rotation of the second gear 102. Therefore, an angle of a seatback frame SF may be adjusted, and an angle of the seatback SB may be adjusted. A cover 106 may be coupled to an inner diameter portion of the second gear 102 so as to surround the spring 109. A guide ring 107 may be coupled to surround an engagement portion where the inner teeth 101a of the first gear 101 and the outer teeth 102a of the second gear 102 engage with one another.

Meanwhile, when an external force is applied to the seatback frame SF, a load L, which is transmitted through an engagement portion between the inner teeth 101a of the first gear 101 and the outer teeth 102a of the second gear 102, is concentrated on the collar part 101b of the first gear 101, which causes deformation of the collar part 101b. The deformation of the collar part 101b may cause a deterioration in engagement properties between the second gear 102 and the first gear 101 and cause damage.

In the related art, a thickness of the collar part 101b of the first gear 101 is increased to solve the above-mentioned problem, but there is a limitation in increasing the thickness of the collar part. The collar part 101b, which is produced by a burring or forming process, has a non-uniform surface roughness SU, and scratches SC are inevitably formed in an axial direction of an outer diameter portion. For this reason, friction of the wedge cams 103, which are in contact with the collar part 101b and rotate, is increased, which adversely affects the operation of the recliner. In addition, as illustrated in FIG. 4, a gap G may be formed between the wedge cam 103 and the socket 105 to compensate for a dimension tolerance condition for each component. The gap G may cause a time difference between an operation of the socket 105 and an operation of the wedge cam 103.

DOCUMENT OF RELATED ART

Patent Document (Patent Document 1) Korean Patent No. 10-2236705 (published on Apr. 6, 2021)

SUMMARY OF THE INVENTION

The present invention has been made in an effort to solve the above-mentioned problem, and an object of the present invention is to provide a recliner for a vehicle seat, in which a thickness of a body portion of a socket is increased, and a coupling portion extending from the body portion is coupled to a center hole of a first gear, such that a supporting force of the socket may be increased, and a load applied to the socket may be dispersed, thereby improving engagement properties between first and second gears.

Another object of the present invention is to provide a recliner for a vehicle seat, in which a contact portion of a socket, which comes into contact with a wedge cam, may be polished to minimize friction of the wedge cam, and the wedge cam may come into contact with and be coupled to a body portion of the socket such that a motion of the wedge cam may be performed at the same time when a shaft is rotated by an operation of a motor.

To achieve the above-mentioned objects, the present invention provides a recliner for a vehicle seat, the recliner including: a first gear having a center hole provided at a center thereof; a second gear being internally in contact with the first gear and configured to eccentrically engage with the first gear; a socket having a coupling portion configured to be coupled to the center hole; and a pair of wedge cams disposed between the socket and the second gear and configured to restrain or release the socket and the second gear.

The coupling portion may extend in a direction from a body portion of the socket to the center hole, the body portion may have a first stepped portion provided at one end thereof and assembled to be directed toward the first gear, and the wedge cam may be in contact with and coupled to the body portion.

The coupling portion may include: a first coupling portion extending from the body portion and having a smaller outer diameter than the body portion so that the first stepped portion is formed on a boundary between the first coupling portion and the body portion; and a second coupling portion extending from the first coupling portion and having a smaller outer diameter than the first coupling portion so that a second stepped portion is formed on a boundary between the second coupling portion and the first coupling portion.

The center hole may include: a first center hole to which the first coupling portion is coupled; and a second center hole to which the second coupling portion is coupled, the second center hole being configured to communicate with the first center hole and configured as a hole smaller than the first center hole.

The socket may be formed by sintering or forging.

The entirety of the socket or a contact portion of the socket, which comes into contact with the wedge cam, may be at least polished.

The socket may include: a wing portion formed on an outer diameter portion of the body portion and spaced apart from the first stepped portion at an interval; a push portion extending in a direction from one surface of the wing portion to the first stepped portion; and an assembling portion protruding from the other surface of the wing portion.

The wing portion may have a coupling groove, an elastic member may be coupled to the assembling portion, and two opposite ends of the elastic member may be coupled to insertion grooves provided at ends of the pair of wedge cams, which face each other, through the coupling groove.

The push portion may have an arc shape, and the wedge cam may be rotated by being pushed by the push portion.

The socket may have an inner diameter portion penetrating a center thereof, and the inner diameter portion may have an angular structure to which a shaft is capable of being coupled.

According to the present invention, the thickness of the body portion of the socket may be increased, and the coupling portion extending from the body portion may be coupled to the center hole of the first gear, such that the supporting force of the socket may be increased, and the load applied to the socket may be dispersed, thereby improving engagement properties between the first and second gears.

According to the present invention, the contact portion of the socket, which comes into contact with the wedge cam, may be polished, thereby minimizing friction of the wedge cam.

The wedge cam may come into contact with and be coupled to the body portion of the socket such that the motion of the wedge cam may be performed at the same time when the shaft is rotated by the operation of the motor.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
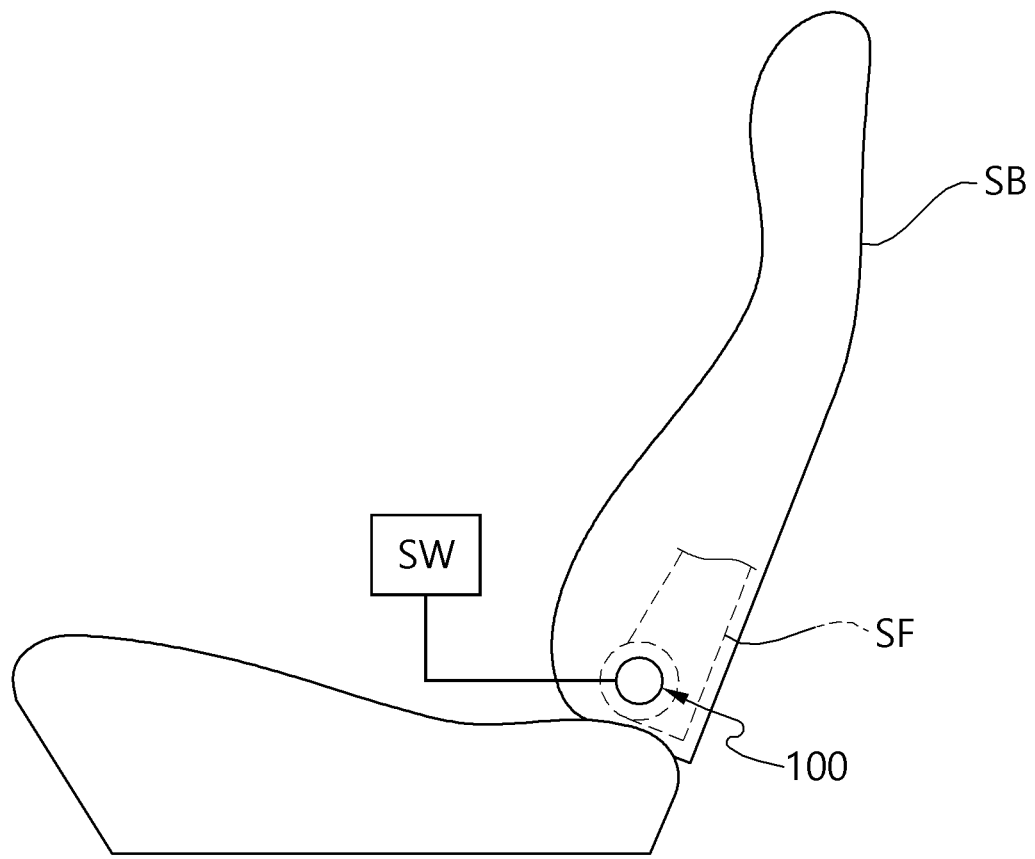
FIG. 1 is a view illustrating a state in which a recliner for a vehicle seat in the related art is mounted on a seatback frame.
Figure 2:
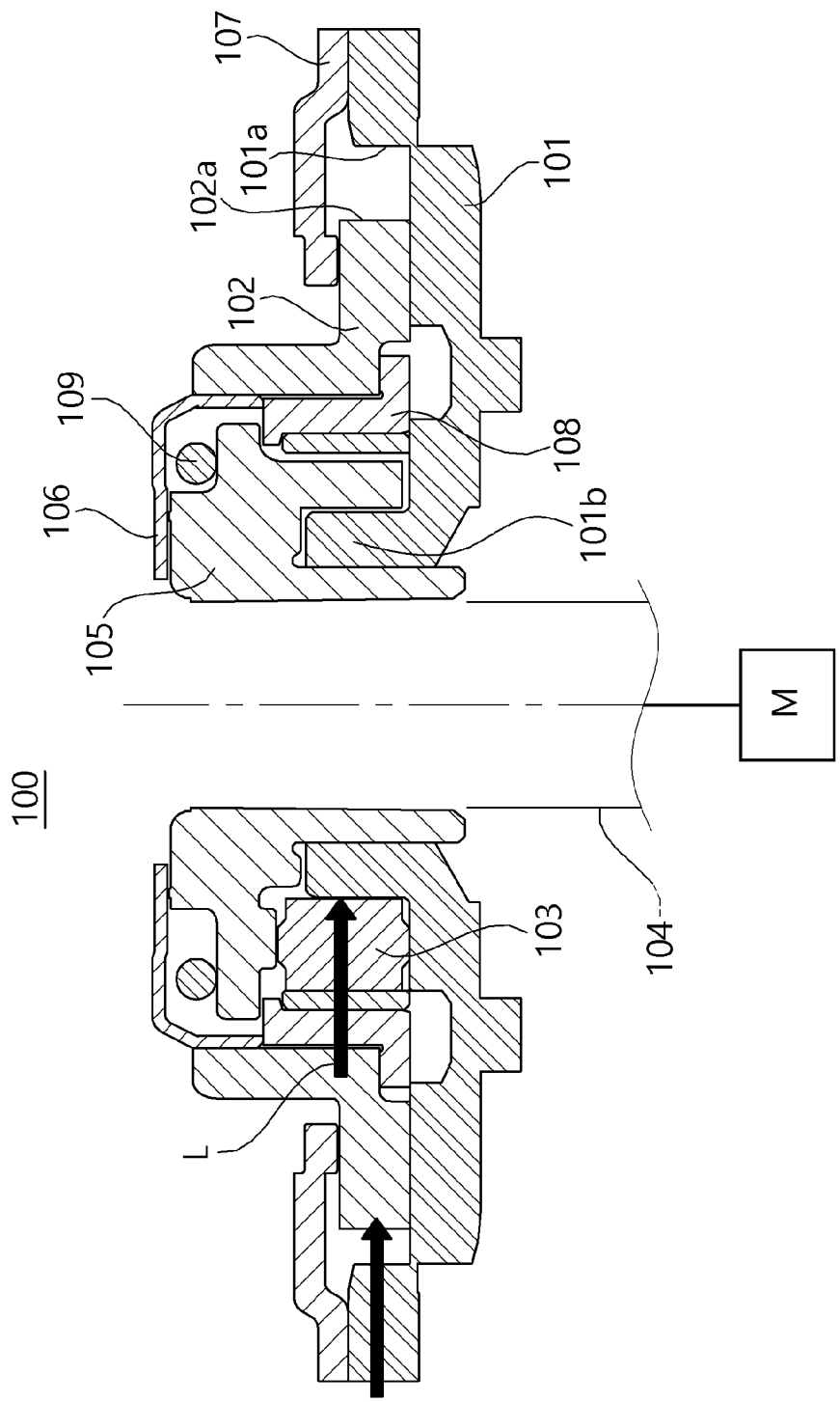
FIG. 2 is a cross-sectional side view of a recliner for a vehicle seat in the related art.
Figure 3:
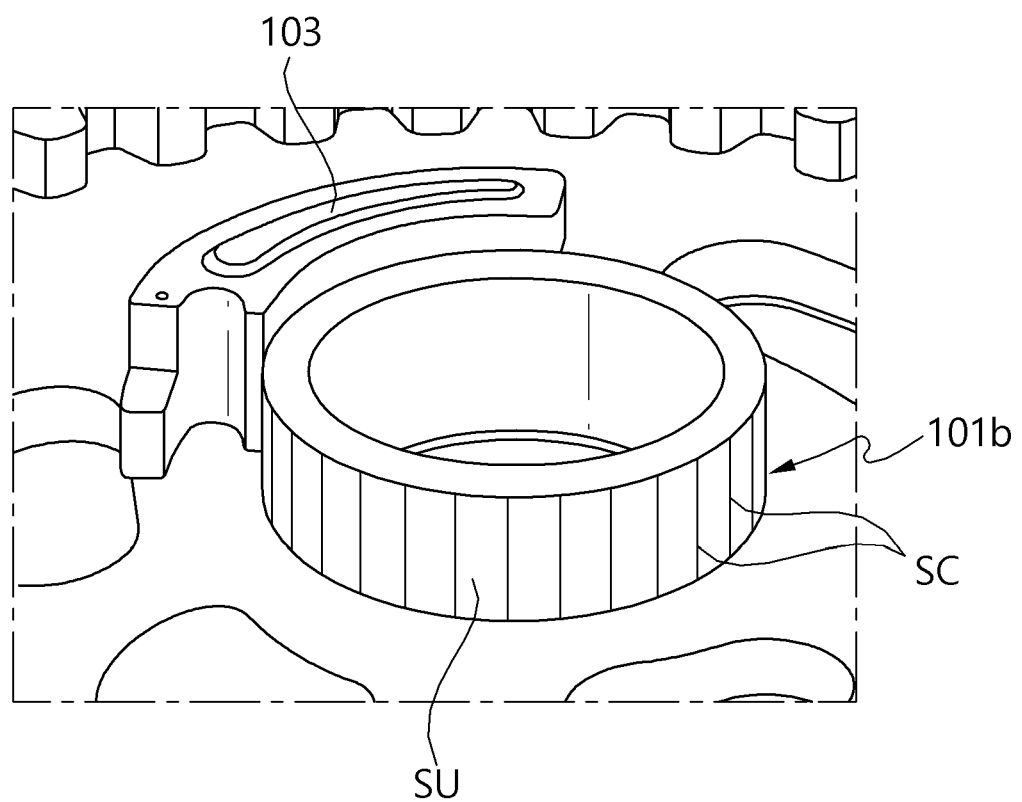
FIG. 3 is a view illustrating a collar part of the recliner for a vehicle seat in the related art.
Figure 4:
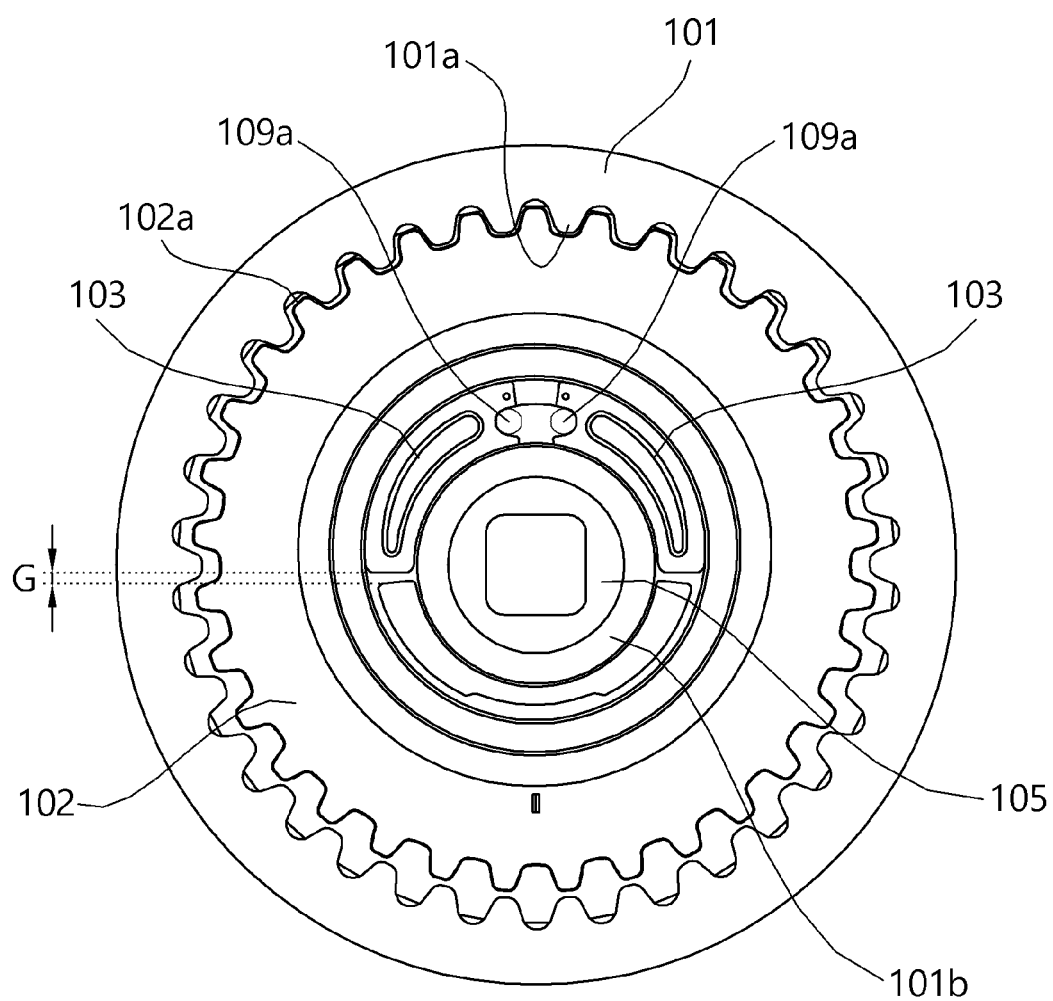
FIG. 4 is a top plan view illustrating a state in which a wedge cam of the recliner for a vehicle seat in the related art is coupled to the collar part.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 5:
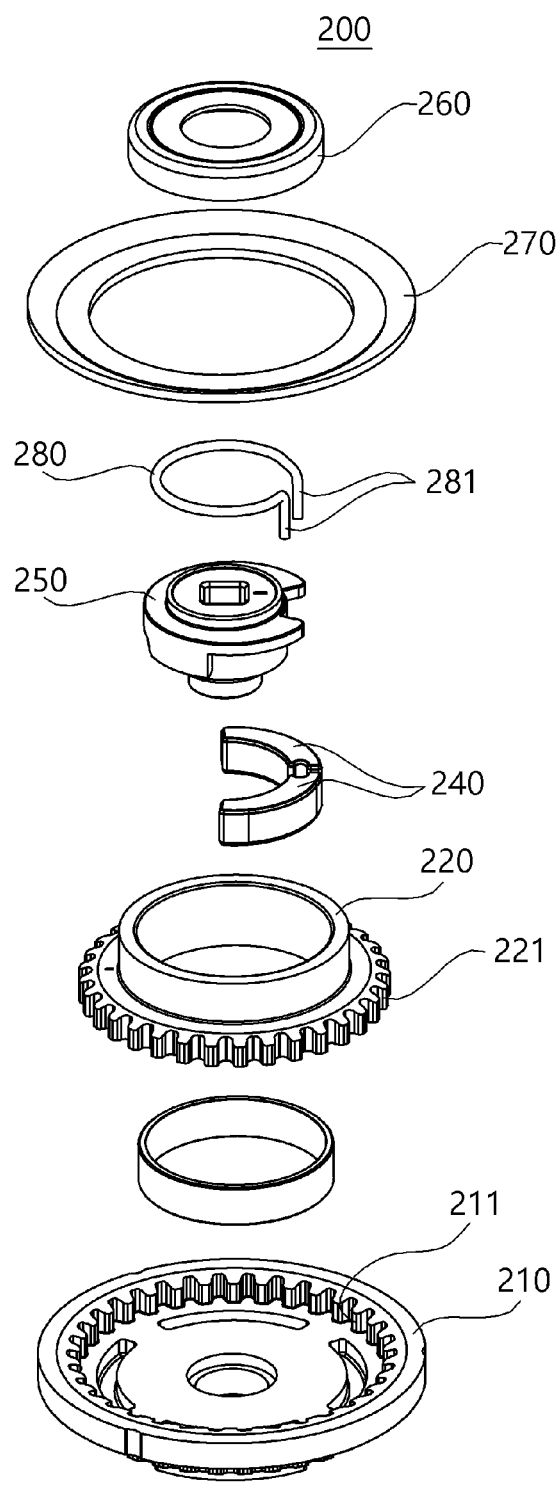
FIG. 5 is an exploded perspective view of a recliner for a vehicle seat according to an exemplary embodiment of the present invention.
Figure 6:
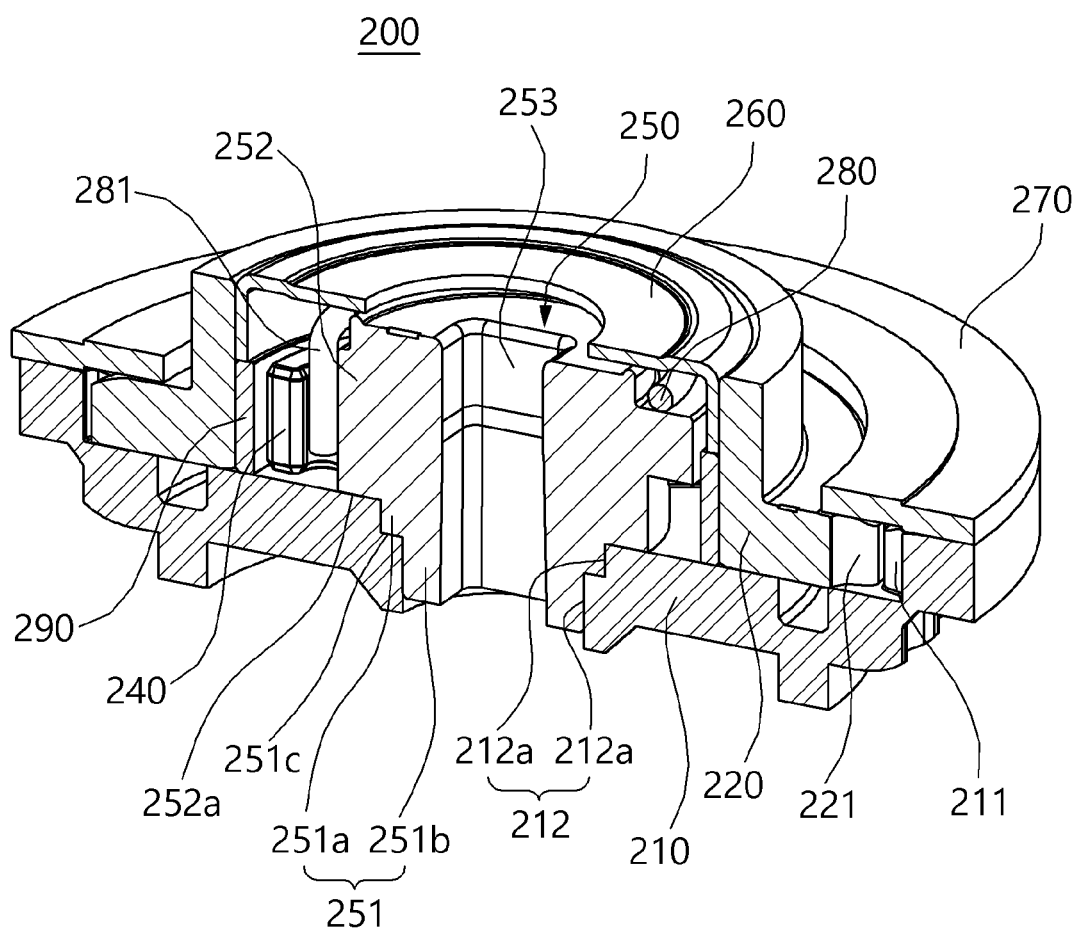
FIG. 6 is a perspective view of the recliner for a vehicle seat according to the exemplary embodiment of the present invention.

FIG. 5 is an exploded perspective view of a recliner for a vehicle seat according to an exemplary embodiment of the present invention, and FIG. 6 is a perspective view of the recliner for a vehicle seat according to the exemplary embodiment of the present invention.

As illustrated in FIGS. 5 and 6, a recliner 200 for a vehicle seat of the present invention includes a first gear 210 having a center hole 212 provided at a center thereof, a second gear 220 being internally in contact with the first gear 210, a socket 250 having a coupling portion 251 coupled to the center hole 212, and a pair of wedge cams 240 coupled between the socket 250 and the second gear 220.

The present invention provides a structure in which the coupling portion 251 of the socket 250 is coupled to the center hole 212 of the first gear 210. Therefore, it is not necessary to provide a collar part on the first gear 210, unlike the related art.

The center hole 212 of the first gear 210 includes a first center hole 212a, and a second center hole 212b configured to communicate with the first center hole 212a. The second center hole 212b is configured as a hole smaller than the first center hole 212a so that a stepped portion is formed between the first center hole 212a and the second center hole 212b.

A coupling member 290 may be coupled to an inner diameter portion of the second gear 220. The coupling member 290 may be positioned between the inner diameter portion of the second gear 220 and the wedge cam 240. For example, the coupling member 290 may be a bushing, a bearing, or the like.

Two opposite ends 281 of an elastic member 280, which are bent and extend, push ends of the pair of two opposite wedge cams 240, which face each other, in a direction in which the ends of the pair of two opposite wedge cams 240 move away from each other. The elastic member 280 may be coupled to the socket 250. The elastic member 280 may be positioned between a first cover 260 and the socket 250.

Figure 7:
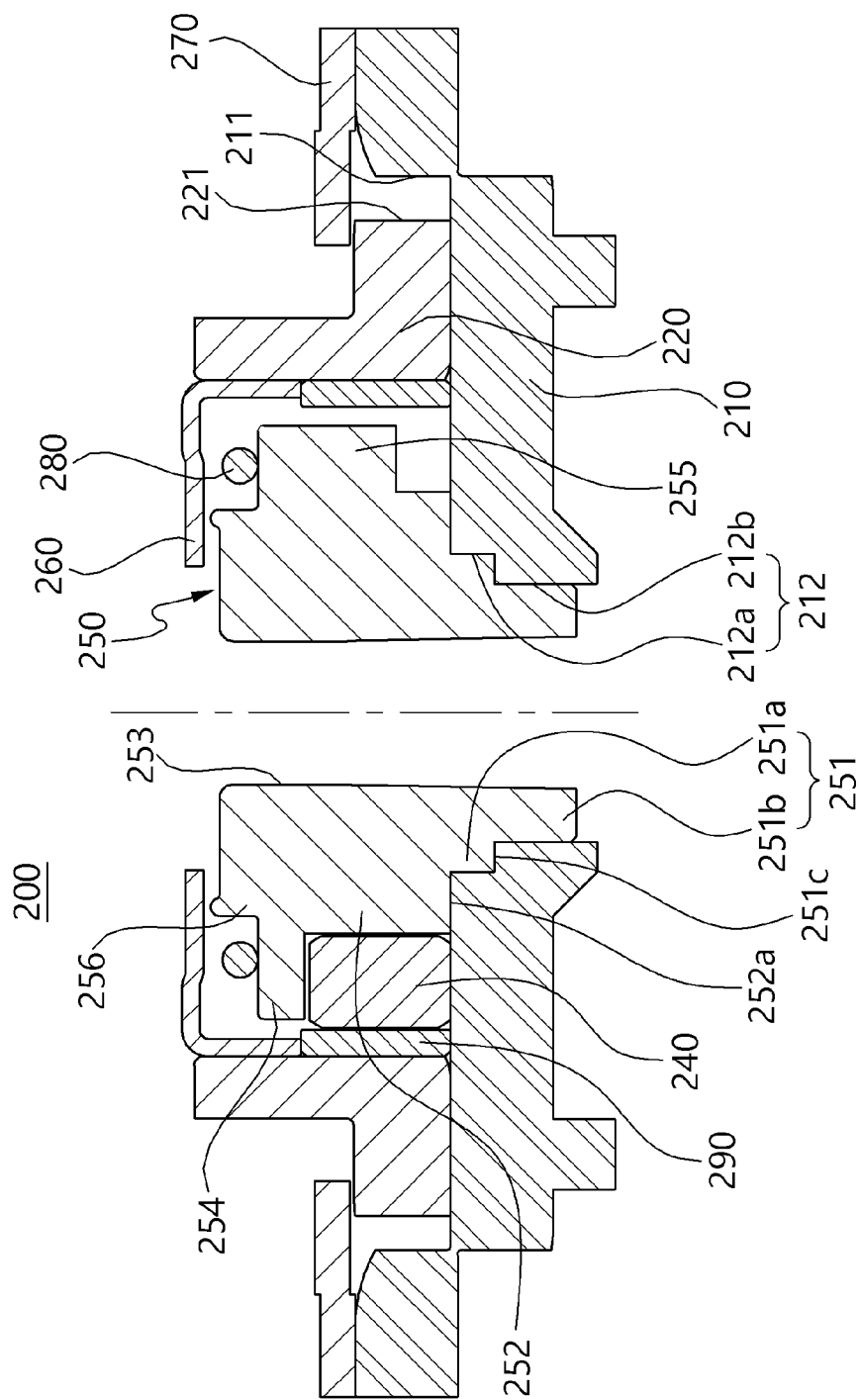
FIG. 7 is a cross-sectional side view of the recliner for a vehicle seat according to the exemplary embodiment of the present invention.
Figure 8:
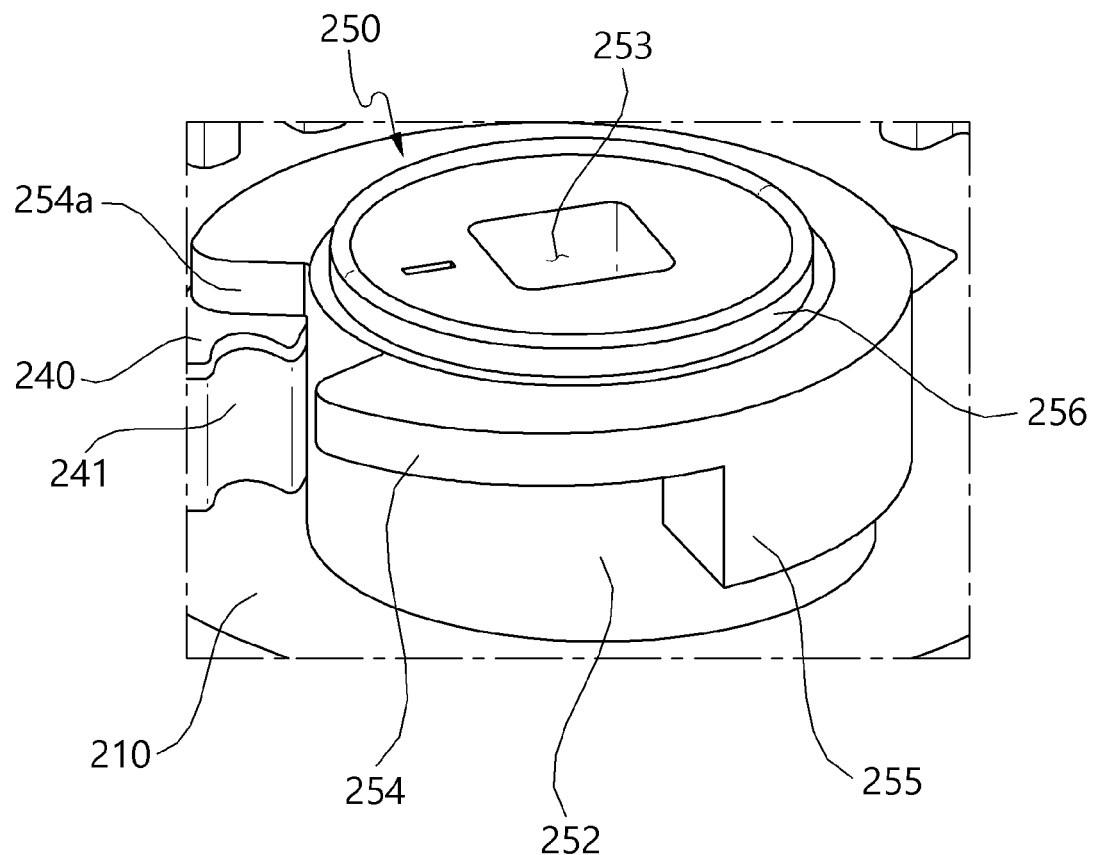
FIG. 8 is an enlarged view of a socket according to the exemplary embodiment of the present invention.
Figure 9:
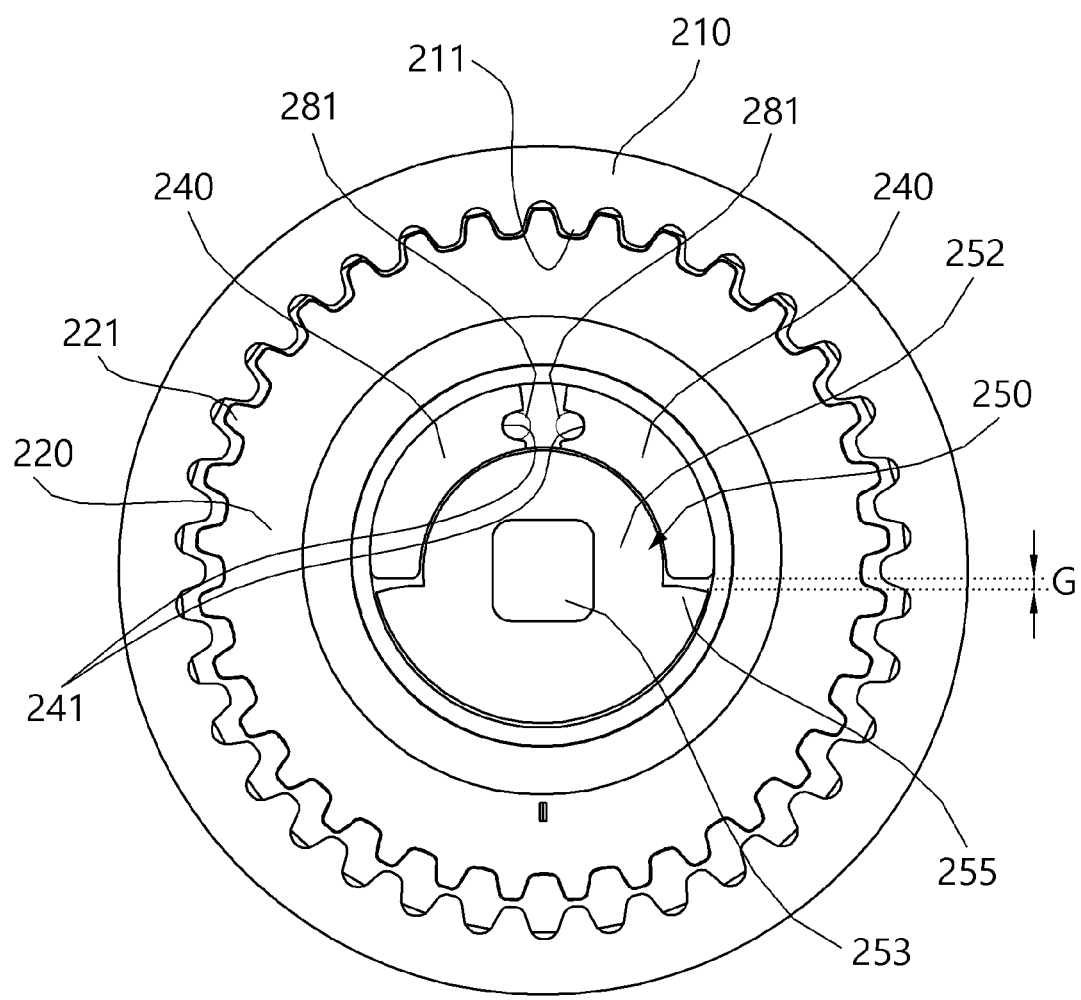
FIG. 9 is a top plan view illustrating a state in which a wedge cam of the recliner for a vehicle seat according to the exemplary embodiment of the present invention is coupled to the socket.

FIG. 7 is a cross-sectional side view of the recliner for a vehicle seat according to the exemplary embodiment of the present invention, FIG. 8 is an enlarged view of a socket according to the exemplary embodiment of the present invention, and FIG. 9 is a top plan view illustrating a state in which a wedge cam of the recliner for a vehicle seat according to the exemplary embodiment of the present invention is coupled to the socket.

As illustrated in FIGS. 7 to 9, the first gear 210 may have inner teeth 211 provided on an inner diameter portion thereof.

The second gear 220 may have a smaller outer diameter than the first gear 210. The second gear 220 may eccentrically engage with the first gear 210. The second gear 220 has outer teeth 221 provided on an outer diameter portion thereof. The outer teeth 221 of the second gear 220 may engage with the inner teeth 211 of the first gear 210.

The wedge cam 240 may have an arc shape. The wedge cam 240 may have a width that gradually increases toward one end thereof. The pair of wedge cams 240 may restrain or release the socket 250 and the second gear 220.

The wedge cam 240 may rotate when the socket 250 rotates. An inner diameter portion 253 of the socket 250 may have an angular structure such as a quadrangular structure. A shaft (not illustrated) for transmitting power may be coupled to the inner diameter portion 253 of the socket 250. The shaft may be connected to a motor (not illustrated).

The socket 250 includes a body portion 252 and the coupling portion 251. Because the body portion 252 rotates at the same time when the socket 250 operates, the wedge cams 240 begin to be released before contact occurs in a gap G. As a result, responsiveness may be improved.

The coupling portion 251 extends in a direction from the body portion 252 to the center hole 212 of the first gear 210.

The coupling portion 251 includes a first coupling portion 251a extending from the body portion 252, and a second coupling portion 251b extending from the first coupling portion 251a.

The first coupling portion 251a has an outer diameter that conforms to the first center hole 212a. During the assembling process, the first coupling portion 251a is inserted into and coupled to the first center hole 212a.

The first coupling portion 251a has a smaller outer diameter than the body portion 252. Therefore, a first stepped portion 252a may be provided on a boundary between the body portion 252 and the first coupling portion 251a.

During the assembling process, the first stepped portion 252a may be assembled to be directed toward the first gear 210. With the above-mentioned structure, a thickness of the body portion 252 is inevitably increased. The increase in thickness of the body portion 252 may minimize a load applied to the socket 250.

The second coupling portion 251b has an outer diameter that conforms to the second center hole 212b. During the assembling process, the second coupling portion 251b is inserted into and coupled to the second center hole 212b.

The second coupling portion 251b extends from the first coupling portion 251a. The second coupling portion 251b has a smaller outer diameter than the first coupling portion 251a. Therefore, a second stepped portion 251c may be provided on a boundary between the first coupling portion 251a and the second coupling portion 251b.

The stepped coupling structures between the coupling portion 251 of the socket 250 and the center hole 212 of the first gear 210 may securely couple the socket 250 to the first gear 210.

The socket 250 includes the inner diameter portion 253, a wing portion 254, a push portion 255 extending from one surface of the wing portion 254, and an assembling portion 256 protruding from the other surface of the wing portion 254.

The inner diameter portion 253 is formed to penetrate a center of the socket 250. The shaft (not illustrated) may be coupled to the inner diameter portion 253. The inner diameter portion 253 may have an angular structure such as a quadrangular structure to which the shaft may be coupled.

The wing portion 254 is formed on an outer diameter portion of the body portion 252 and spaced apart from the first stepped portion 252a at an interval. For example, the wing portion 254 may be formed circularly. The wing portion 254 has a coupling groove 254a. The wing portion 254 is coupled to surround the wedge cams 240 during the assembling process. As the body portion 252 and the wing portion 254 are formed, an assembling space for the wedge cams 240 may be formed between the body portion 252 and the wing portion 254.

The push portion 255 extends in a direction from one surface of the wing portion 254 to the first stepped portion 252a. The push portion 255 may have an arc shape. When the socket 250 rotates, the wedge cams 240 may be rotated by being pushed by the push portion 255 (see FIG. 9).

The elastic member 280 may be coupled to the assembling portion 256, such that the two opposite bent ends 281 may be coupled to insertion grooves 241 provided at the ends of the pair of wedge cams 240, which face each other, through the coupling groove 254a. For example, the elastic member 280 may be a spring.

The first cover 260 may be coupled to the inner diameter portion of the second gear 220. The first cover 260 may prevent the separation of the wedge cams 240, the socket 250, the elastic member 280, and the like that are coupled in the second gear 220. For example, the first cover 260 may be coupled to the inner diameter portion of the second gear 220 by welding.

A second cover 270 may be coupled to an outer diameter portion of the first gear 210. The second cover 270 may be coupled to surround an engagement portion between the inner teeth 211 of the first gear 210 and the outer teeth 221 of the second gear 220, thereby preventing the second gear 220 from separating from the first gear 210.

As illustrated in FIG. 8, the socket 250 may be formed by sintering or forging.

The entirety of the socket 250, which is formed by sintering or forging, or the contact portion of the socket 250, which comes into contact with the wedge cams 240, may be polished. For example, at least the body portion 252 of the socket 250 may be polished.

The polishing may remove scratches on the socket 250 and optimize surface roughness. Therefore, the friction of the wedge cam 240, which is in contact with the socket 250, may be minimized, thereby allowing the wedge cam 240 to operate smoothly.

Next, a load applied to the socket of the present invention will be described.

Figure 10:
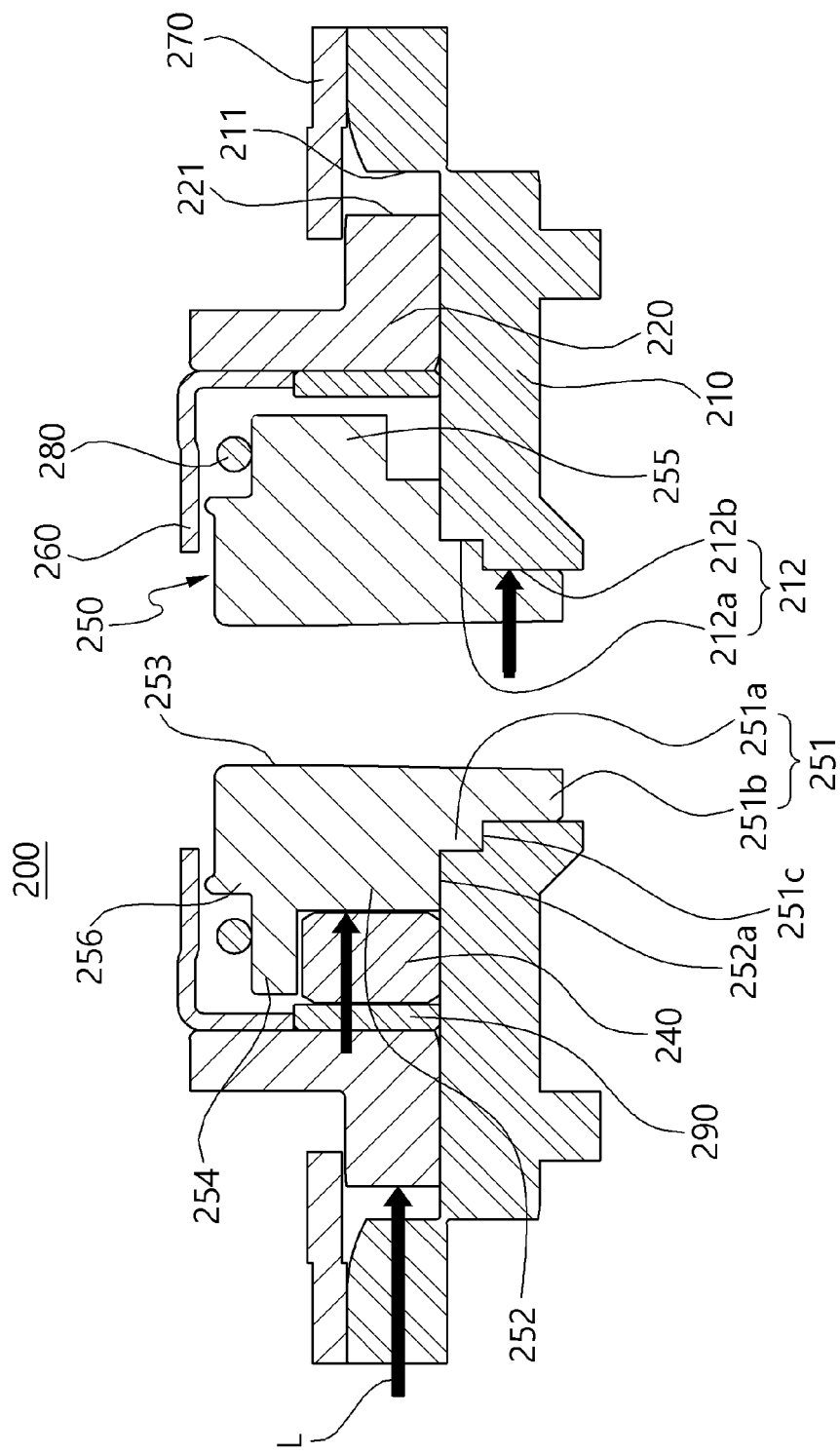
FIG. 10 is a view illustrating a load applied to the socket of the recliner for a vehicle seat according to the exemplary embodiment of the present invention.

FIG. 10 is a view illustrating a load applied to the socket of the recliner for a vehicle seat according to the exemplary embodiment of the present invention.

In the related art, when an external force is applied to a seatback frame, a load, which is transmitted through an engagement portion between inner teeth of a first gear and outer teeth of a second gear, is concentrated on a collar part of the first gear, which causes deformation of the collar part. The deformation of the collar part causes a deterioration in engagement properties between the second gear and the first gear and causes damage.

However, because the present invention provides the structure in which the coupling portion 251 of the socket 250 is coupled to the center hole 212 of the first gear 210, the collar part of the first gear in the related art is not required, the thickness of the body portion 252 of the socket 250 is inevitably increased, and thus the load applied to the socket 250 may be minimized.

As illustrated in FIG. 10, in the recliner 200 of the present invention, a load L, which is applied to the socket 250 through the engagement portion between the inner teeth 211 of the first gear 210 and the outer teeth 221 of the second gear 220, may be dispersed by the body portion 252 with the increased thickness. Therefore, it is possible to ensure engagement performance of the first gear 210 and the second gear 220.

In the related art, because the collar part, with which the wedge cam is in contact, is manufactured by burring or forming, the outer diameter portion of the collar part is scratched, and non-uniform surface roughness is caused. Further, because the collar part is integrated with the first gear, it is not easy to process the outer diameter portion of the collar part.

However, in the present invention, the socket 250 coupled to the center hole 212 of the first gear 210 is separately configured. Therefore, it is very easy to perform the polishing, such as barreling, on the entirety of the socket 250 or the contact portion of the socket 250, which is in contact with the wedge cam 240, during a subsequent process after the socket 250 is formed by sintering or forging.

The surface roughness of the outer diameter portion of the socket 250 may be optimized, and scratches may be perfectly removed by polishing the outer diameter portion of the socket 212. The contact portion of the socket 250, which comes into contact with the wedge cam 240, may be polished, such that the friction of the wedge cam 240, which operates by being in contact with the socket 250, may be minimized, thereby allowing the wedge cam 240 to operate smoothly.

Next, a process of adjusting an angle of the seatback of the present invention will be described.

As illustrated in FIGS. 9 and 10, the motor (not illustrated) is operated by an operation of a switch (not illustrated), and the shaft (not illustrated) connected to the motor rotates.

The socket 250 connected to the shaft is rotated by the rotation of the shaft. The push portion 255 rotates as the socket 250 rotates. The wedge cam 240 may be rotated by being pushed by the push portion 255. The second gear 220 may be rotated by the rotations of the socket 250 and the wedge cam 240.

The first gear 210 rotates in conjunction with the rotation of the second gear 220. As the first gear 210 rotates, an angle of the seatback frame (not illustrated) may be adjusted, such that an angle of the seatback (not illustrated) may be adjusted in conjunction with the adjustment of the angle of the seatback frame.

The present invention may be applied to a powered recliner configured to be automatically operated by power of a motor in response to a switch manipulation.

According to the present invention as described above, the thickness of the body portion of the socket may be increased, and the coupling portion extending from the body portion may be coupled to the center hole of the first gear, such that the supporting force of the socket may be increased, and the load applied to the socket may be dispersed, thereby improving engagement properties between the first and second gears. In addition, according to the present invention, the contact portion of the socket, which comes into contact with the wedge cam, may be polished, thereby minimizing friction of the wedge cam. In addition, the wedge cam may come into contact with and be coupled to the body portion of the socket such that the motion of the wedge cam may be performed at the same time when the shaft is rotated by the operation of the motor.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A recliner for a vehicle seat, the recliner comprising:
a first gear having a center hole defined at a center thereof;
a second gear being in contact with an inner portion of the first gear and configured to eccentrically engage with the first gear;
a socket having a coupling portion configured to be coupled to the center hole; and
a pair of wedge cams disposed between the socket and the second gear and configured to restrain or release the socket and the second gear,
wherein the coupling portion extends in a direction from a body portion of the socket to the center hole, the body portion has a first stepped portion defined at one end thereof and directed toward the first gear, and the pair of wedge cams are in contact with and coupled to the body portion,
wherein the first stepped portion extends on and along a surface of the first gear to a position where the surface of the first gear and a surface of the pair of wedge cams contact each other, such that the surface of the pair of wedge cams is coplanar with the first stepped portion.

2. The recliner of claim 1,
wherein the coupling portion comprises:
a first coupling portion extending from the body portion and having a smaller outer diameter than the body portion so that the first stepped portion is defined on a boundary between the first coupling portion and the body portion; and
a second coupling portion extending from the first coupling portion and having a smaller outer diameter than the first coupling portion so that a second stepped portion is defined on a boundary between the second coupling portion and the first coupling portion.

3. The recliner of claim 2,
wherein the center hole comprises:
a first center hole to which the first coupling portion is coupled; and
a second center hole to which the second coupling portion is coupled, the second center hole being configured to communicate with the first center hole and having a hole diameter smaller than a hole diameter of the first center hole.

4. The recliner of claim 1, wherein the socket is formed by sintering or forging.

5. The recliner of claim 4, wherein an entire surface of the socket or at least a contact portion of the socket, which comes into contact with at least one of the pair of wedge cams, is polished.

6. The recliner of claim 2,
wherein the socket comprises:
a wing portion disposed on an outer diameter portion of the body portion and spaced apart from the first stepped portion at an interval;
a push portion extending in a direction from one surface of the wing portion toward the first stepped portion; and
an assembling portion protruding from another surface of the wing portion.

7. The recliner of claim 6, wherein the wing portion has a coupling groove, an elastic member is coupled to the assembling portion, and two opposite ends of the elastic member are coupled to insertion grooves defined at ends of the pair of wedge cams, which face each other, through the coupling groove.

8. The recliner of claim 6, wherein the push portion has an arc shape, and the pair of wedge cams are configured to be rotated by being pushed by the push portion.

9. The recliner of claim 6, wherein the socket has an inner diameter portion penetrating a center thereof, and the inner diameter portion has an angular structure capable of being coupled with a shaft.

10. A recliner for a vehicle seat, the recliner comprising:
a first gear having a center hole defined at a center thereof;
a second gear being in contact with an inner portion of the first gear and configured to eccentrically engage with the first gear;
a socket having a coupling portion configured to be coupled to the center hole; and
a pair of wedge cams disposed between the socket and the second gear and configured to restrain or release the socket and the second gear,
wherein the coupling portion extends in a direction from a body portion of the socket to the center hole, and the body portion has a first stepped portion defined at one end thereof and directed toward the first gear, and
wherein the socket comprises:
a wing portion disposed on an outer diameter portion of the body portion and spaced apart from the first stepped portion at an interval;
a push portion extending in a direction from one surface of the wing portion toward the first stepped portion; and
an assembling portion protruding from another surface of the wing portion.

* * * * *